US011521397B2

(12) United States Patent
Petrany et al.

(10) Patent No.: US 11,521,397 B2
(45) Date of Patent: Dec. 6, 2022

(54) OBJECT TRACKING FOR WORK MACHINES

(71) Applicant: Caterpillar Inc., Peoria, IL (US)

(72) Inventors: Peter Petrany, Dunlap, IL (US);
Benjamin J. Hodel, Dunlap, IL (US);
Vamsi Krishna Pannala, Peoria, IL (US);
Nicholas Payne, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 154 days.

(21) Appl. No.: 17/014,697

(22) Filed: Sep. 8, 2020

(65) Prior Publication Data

US 2022/0076033 A1 Mar. 10, 2022

(51) Int. Cl.
G06V 20/58 (2022.01)
B60W 50/14 (2020.01)
G06V 10/25 (2022.01)

(52) U.S. Cl.
CPC ............ G06V 20/58 (2022.01); B60W 50/14 (2013.01); G06V 10/25 (2022.01); B60W 2050/143 (2013.01); B60W 2420/42 (2013.01)

(58) Field of Classification Search
None
See application file for complete search history.

(56) References Cited

U.S. PATENT DOCUMENTS

| 5,587,929 | A | 12/1996 | League et al. |
| 7,692,548 | B2 | 4/2010 | Bonefas et al. |
| 8,131,432 | B2 | 3/2012 | Senneff et al. |
| 9,836,059 | B2* | 12/2017 | Hiramatsu ............. B60Q 5/005 |
| 10,023,204 | B1 | 7/2018 | Kim et al. |
| 10,435,017 | B2 | 10/2019 | Madas et al. |
| 2012/0287277 | A1* | 11/2012 | Koehrsen ............... H04N 7/181 348/148 |
| 2013/0088593 | A1* | 4/2013 | Ishimoto ................. E02F 9/261 348/143 |
| 2016/0005286 | A1* | 1/2016 | Kiyota .................... E02F 9/262 340/435 |
| 2018/0370034 | A1* | 12/2018 | Lee ........................ B25J 9/1676 |
| 2021/0072764 | A1* | 3/2021 | Kean ..................... G05D 1/0257 |
| 2021/0238827 | A1* | 8/2021 | Ries ........................ B60Q 5/006 |
| 2021/0310218 | A1* | 10/2021 | Hagiwara ............... E02F 9/123 |
| 2022/0064909 | A1* | 3/2022 | Sasaki ....................... G08B 3/10 |
| 2022/0170244 | A1* | 6/2022 | Hagiwara ............. E02F 9/2235 |

* cited by examiner

Primary Examiner — Santiago Garcia
(74) Attorney, Agent, or Firm — Schwegman, Lundberg & Woessner

(57) ABSTRACT

A system and method for monitoring objects in the vicinity of a work machine that is in motion includes obtaining, using a camera associated with the work machine, first image data of a field-of-view of the camera at a first position; identifying an object-of-interest within the first image data; associating an alarm with the object-of-interest, the alarm configured to indicate the presence of the object-of-interest; presenting the alarm through an output device; receiving an input to snooze the alarm for the object-of-interest; generating a mask for the object-of-interest using image coordinates of the object-of-interest within the first image data; obtaining, using the camera, second image data of the field-of-view of the camera at a second position during motion of the work machine; identifying an object within the second image data; and selectively aborting the alarm presentation through the output device in response to determining, using the mask, that the object is the object-of-interest.

20 Claims, 6 Drawing Sheets

OBJECT TRACKING FOR WORK MACHINES

TECHNICAL FIELD

The present application relates generally to work machines. More particularly, the present application relates to tracking objects using cameras associated with work machines.

BACKGROUND

Work machines, such as excavators, may include alarms that alert an operator of the machine that an object is detected within a vicinity of the machine. One such system for detecting objects is described in U.S. Pat. No. 5,587,929, which describes a system for detecting objects within a field-of-view of detector. This system does not address objects that move in and out of the field-of-view of the detector due to motion of the machine. For example, for machines that are moving, such as rotating, objects that are initially detected may move out of view and back into view, re-triggering an alarm. For a rotating machine, this can cause the alarm to go off each rotation for a stationary object that was previously detected.

SUMMARY OF THE INVENTION

In one example, a method for monitoring objects in the vicinity of a work machine that is in motion includes obtaining, using a camera associated with the work machine, first image data of a field-of-view of the camera at a first position; identifying an object-of-interest within the first image data; associating an alarm with the object-of-interest, the alarm configured to indicate the presence of the object-of-interest; presenting the alarm through an output device; receiving an input to snooze the alarm for the object-of-interest; generating a mask for the object-of-interest using image coordinates of the object-of-interest within the first image data; obtaining, using the camera, second image data of the field-of-view of the camera at a second position during motion of the work machine; identifying an object within the second image data; and selectively aborting the alarm presentation through the output device in response to determining, using the mask, that the object is the object-of-interest.

A system for monitoring objects in the vicinity of a work machine that is in motion includes a camera, an output device and a controller. The camera is associated with the work machine and configured to obtain image data for a field-of-view of the camera. The controller is associated with the camera and configured to: obtain, using the camera, first image data of the field-of-view of the camera at a first position; identify an object-of-interest within the first image data; associate an alarm with the object-of-interest, the alarm configured to indicate the presence of the object-of-interest; present the alarm through the output device; receive an input to snooze the alarm for the object-of-interest; generate a mask for the object-of-interest using image coordinates of the object-of-interest within the first image data; obtain, using the camera, second image data of the field-of-view of the camera at a second position during motion of the work machine; identify an object within the second image data; and selectively abort the alarm presentation through the output device in response to determining, using the mask, that the object is the object-of-interest.

A control system for a work machine includes one or more hardware processors and a memory, storing instructions, which when executed, cause the one or more hardware processors to perform operations that include: obtaining, using a camera associated with the work machine, first image data of a field-of-view of the camera at a first position; identifying an object-of-interest within the first image data; associating an alarm with the object-of-interest, the alarm configured to indicate the presence of the object-of-interest; presenting the alarm through an output device; receiving an input to snooze the alarm for the object-of-interest; generating a mask for the object-of-interest using image coordinates of the object-of-interest within the first image data; obtaining, using the camera, second image data of the field-of-view of the camera at a second position during motion of the work machine; identifying an object within the second image data; and selectively aborting the alarm presentation through the output device in response to determining, using the mask, that the object is the object-of-interest.

DETAILED DESCRIPTION

Figure 1:
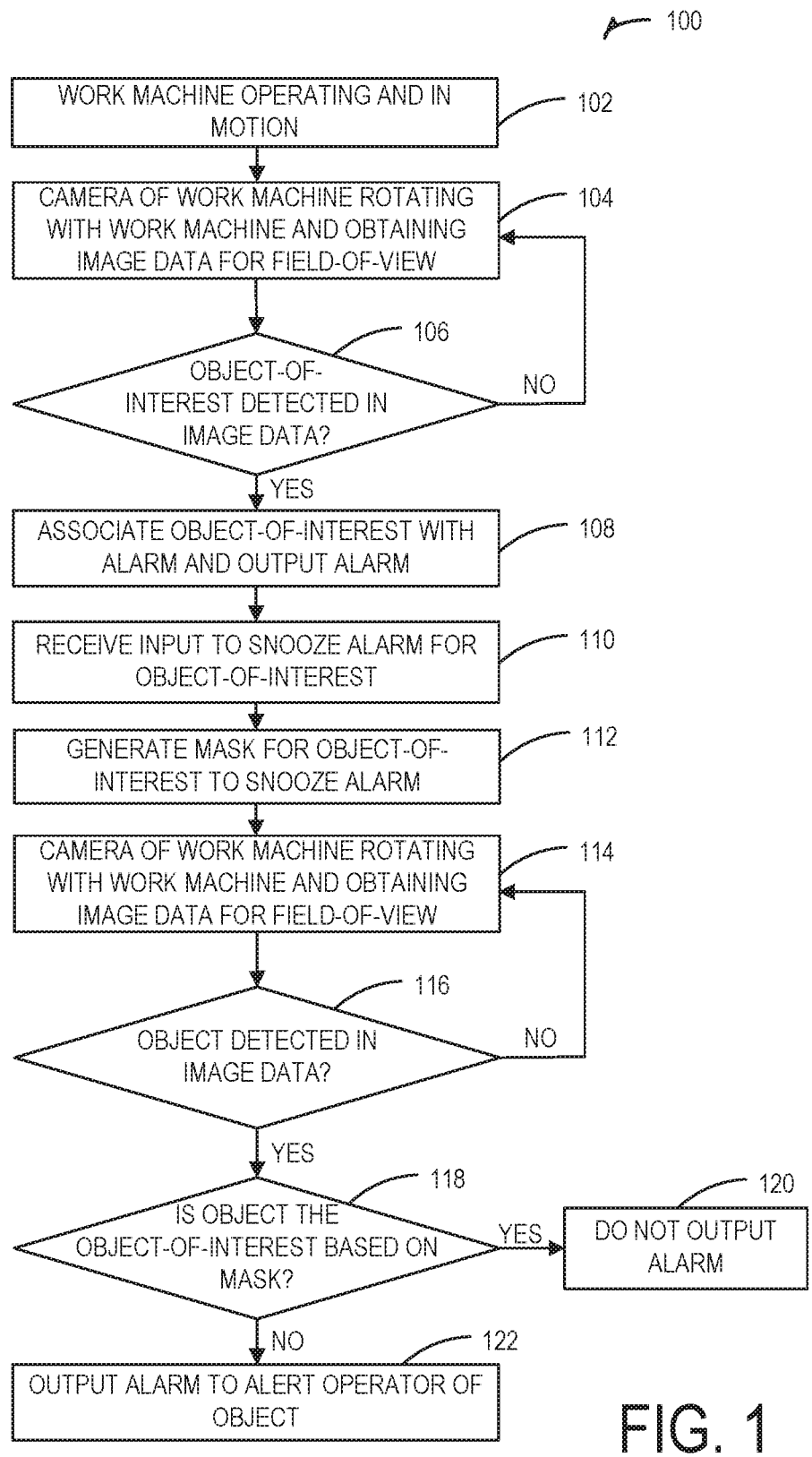
FIG. 1 is flowchart illustrating a method of tracking an object that moves in and out of a field-of-view of a camera associated with a work machine in motion.

FIG. 1 is a is flowchart illustrating a method 100 of tracking an object that moves in and out of a field-of-view of a camera associated with a work machine in motion. For work machines in motion, such as work machines that are rotating, objects that are detected within the vicinity of the work machine may move in and out of a field-of-view of a camera or other image capture device associated with the work machine as the work machine rotates. This can result in an alert being output to an operator of the work machine each rotation, which can lead to an operator disabling or otherwise ignoring the alerts. It is desirable to allow an operator to snooze alerts for an already detected object that moves in and out of a field-of-view of a camera of an object detection system for a work machine.

At step 102, a work machine is operating and in motion. In an example, the work machine is an excavator or other rotating machine and is rotating about a machine axis. In other examples, the work machine may be any machine and may be moving in any manner such that relatively stationary objects move in and out of a field-of-view of a camera associated with the work machine. At step 104, while the work machine is in motion, a camera or other image capture device associated with the work machine is capturing image data for a field-of-view of the camera. In some examples, the camera may be mounted to a frame of the work machine and configured to rotate or otherwise move with the work machine.

The camera associated with the work machine may be part of an image-based object detection system configured to obtain image data for use in detecting objects within the vicinity of the work machine in order to alert an operator of the work machine of the presence of the object. For example, the object may be a person, animal, obstacle, or other object-of-interest for an operator of the work machine. In an example, the image data may be one or more image frames of video data captured by a sensor array of the camera.

At step 106, the image data is analyzed to determine if any objects-of-interest are present within the image data. An object-of-interest may be any detected object, an object that is detected within a threshold distance of the work machine, a specific type of object, such as a person, or the like. This determination may be performed by one or more controllers. The controllers may be part of a control system of the work machine, one or more controllers local to the camera, controllers associated with a standalone visual image detection system, or any other control circuit. The image data may be analyzed to detect the objects using one or more methods of feature recognition, such as edge detection, or any other image processing techniques employed by visual based object detection systems, for example. If no objects-of-interest are detected in the captured image data, the method 100 returns to step 104 and new image data is captured and analyzed. If an object-of-interest is detected in the current image data, the method 100 proceeds to step 108.

At step 108, the object-of-interest detected within the image data is associated with an alarm or other alert, and the alarm is output to the operator of the work machine. The alarm may be audible and output through one or more speakers or other audio devices, may be visual and output through a display, or may be any other form of alarm or alert output through any form of output device. At step 110, the operator of the work machine may select to snooze the alarm for the object-of-interest. This may be desirable if the operator anticipates that the object is relatively stationary and will move in and out of the field-of-view of the camera due to the motion of the machine, such as rotation of the machine. For example, a flagger standing in the vicinity of a rotating excavator may be detected. As the flagger will likely remain in the same position with respect to the machine, triggering an alarm with each rotation of the work machine, it may be desirable for the operator of the excavator to snooze the alarm so that the alarm is not output every rotation of the excavator.

The input from the operator to snooze the object may be through a control pad, a touch display, a switch, or any other electronic or mechanical input. For example, a display may output image data captured by a respective camera with one or more indicators overlaid on the image data to indicate to an operator of the work machine one or more detected objects, including the object-of-interest. The display may also indicate which camera has captured the current image data for examples in which a work machine has multiple associated cameras. The operator may then select or otherwise provide an input to snooze the object-of-interest, such as tapping the object-of-interest. This may be accomplished through a touchscreen display or other input device such as one or more buttons, a control pad, or the like. In another example, a list of detected objects may be displayed to an operator, and the operator may scroll through the list of detected objects to select one or more objects to snooze. For example, as the operator scrolls through the detected objects, a currently selected object may be output on the display.

In some examples, a single display may be used to output detected objects to an operator of the work machine for object detection systems with multiple cameras. For example, images from multiple cameras may be fused for a single display to the operator. In this example, detected objects may be associated with a camera identifier for use in identifying the camera that detected the object. For example, detected objects may include an instance identifier that corresponds to a source camera identifier. The instance identifier may then be used when snoozing or un-snoozing a detected object to identify the source camera. In some examples, if there are overlapping or adjacent objects on the fused display that are each detected by different respective cameras, the object closest to an input selection point (e.g., a coordinate of a tap on a touchscreen display) from the operator can be used to identify the source camera.

At step 112, in response to receiving the snooze input, a mask may be generated for the object-of-interest. The mask may be generated by a controller of the work machine, a controller of a visual based object detection system, or any other controller. The mask may be stored in a memory associated with the camera that may be referenced when an object is detected to determine if the object has been previously detected and snoozed. For example, multiple masks may be stored in a memory for multiple snoozed objects, each mask comparable to a detected object to determine if the object has been snoozed.

In an example, the mask may be generated with respect to a reference frame of the work machine such that the mask rotates with respect to the reference frame of the work machine. In this example, the mask may be defined using one or more equations, a lookup table with a series of time-based coordinates, or any other method of defining a rotating mask. In an example, the mask may be determined by observing the object as the object moves through the field-of-view of the camera, for example, or using any other method. For example, the trajectory of the object may be observed as the object moves through the field-of-view of the camera and extrapolated to define the mask for the object-of-interest. In another example, the mask may be stationary with respect to the rotating work machine. A stationary mask may be generated as described with respect to FIG. 2, for example.

At step 114, while the work machine is in motion, the camera associated with the work machine is continuing to capture image data for the field-of-view of the camera and at step 116, it is determined if an object is detected in the image data obtained at step 114. If an object is detected, the method 100 proceeds to step 118 and if an object is not detected, the method 100 returns to step 114. At step 118, it is determined if a mask is associated with the detected object. This may be accomplished by comparing coordinates of the detected object with the mask. For example, the coordinates with respect to the work machine may be identified directly from the image data. The position of the camera may be calibrated to the coordinates of the work machine such that the pixel coordinates of the object within the image data directly correlate to the position of the object relative to the work machine. If the mask is rotating with respect to the stationary reference frame of the work machine, the coordinates of the rotating mask at the time the image data is collected can be compared to the coordinates of the object.

If the object is associated with a mask, the method 100 proceeds to step 120 and no alarm is output to the operator of the work machine. If the object is not associated with a mask, the method 100 proceeds to step 122 and an alarm is output to the operator of the work machine to alert the operator to the detected object. This way, the operator is not alerted to objects which have already been assessed and snoozed by the operator of the work machine. This provides the advantage that an operator is less likely to disable alerts or otherwise ignore alerts from an object detection system for a rotating machine because the operator does not receive as many alerts for a same object.

Figure 2:
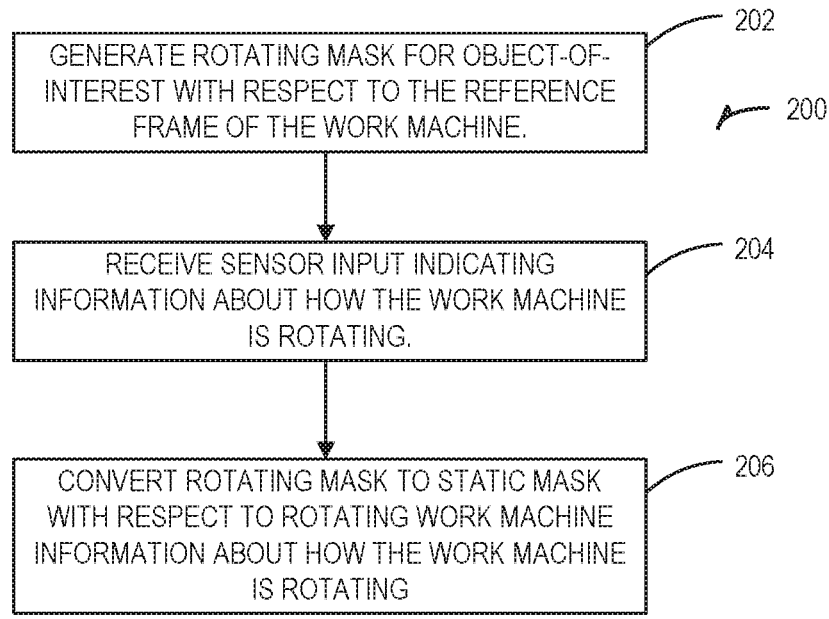
FIG. 2 is a flowchart illustrating a method of converting a rotating mask to a stationary mask.

FIG. 2 is a flowchart illustrating a method 200 of converting a rotating mask to a stationary mask with respect to a reference frame of the work machine. At step 202, a rotating mask with respect to the reference frame of the work machine is generated. This may be accomplished as discussed above with respect to step 112 of FIG. 1. The rotating mask may be defined using one or more equations with respect to a center axis of rotation of the work machine, a series of time-based coordinates, or the like.

At step 204, additional sensor data for the work machine may be received. In some examples, this may be additional sensor data such as radar data, lidar data, positioning data, such as global positioning system (GPS) data, or any other sensor data. In some examples, the additional data may be data extracted from the image data of the camera. For example, background features may be extracted from the image data to identify position information of the work machine. The additional data may be used to identify information about how the work machine is rotating, such as a current angular position of the work machine, an angular speed of the work machine, or the like.

At step 206, information about how the work machine is rotating that is identified at step 204 is used to convert the rotating mask for the object-of-interest to a stationary mask (in which the work machine rotates with respect to the mask).

Using the additional information, the work machine may identify a geometric position of a detected object and compare the geometric position to the stationary mask to determine if the detected object is a snoozed object-of-interest.

Figure 3:
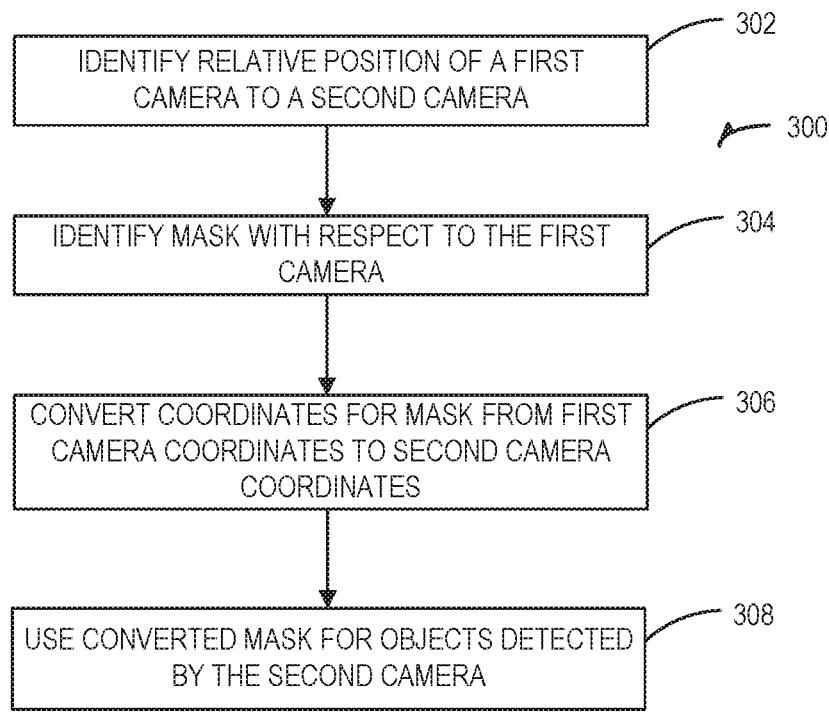
FIG. 3 is a flowchart illustrating a method of translating a mask for a field-of-view of a first camera to a field-of-view for a second camera associated with a work machine.

FIG. 3 is a flowchart illustrating a method 300 of translating a mask for a field-of-view of a first camera to a field-of-view for a second camera associated with a work machine. Some work machines may have multiple cameras or image capture devices attached or otherwise associated with the work machine for detecting objects. When an alarm is snoozed for an object detected by a first camera, it may be desirable to snooze the object for all cameras associated with the work machine. At step 302, the relative positions of the cameras with respect to each other are determined. This may be determined when the cameras are installed, for example, by installing the cameras at a known distance from each other. This way, the coordinates for image data from a first camera can be translated to coordinates for image data to a second camera.

At step 304, an object is detected in image data of a first camera and an alarm is output to the operator of the work machine. An input is received from the operator to snooze the detected object. For example, a display may indicate to an operator that the object was detected by the first camera and may display the object to the operator using image data from the first camera. A mask is generated for the snoozed object such as a rotating mask or a stationary masked as discussed herein. At step 306, coordinates are converted from the first camera to the second camera for the generated mask. This may be done in response to a detected object by the second camera, may be done automatically upon generation of the mask for the first camera, or at any other time. At step 308, the converted mask is used for objects detected by the second camera to determine if the detected objects have been snoozed by the operator of the work machine.

Figure 4A:
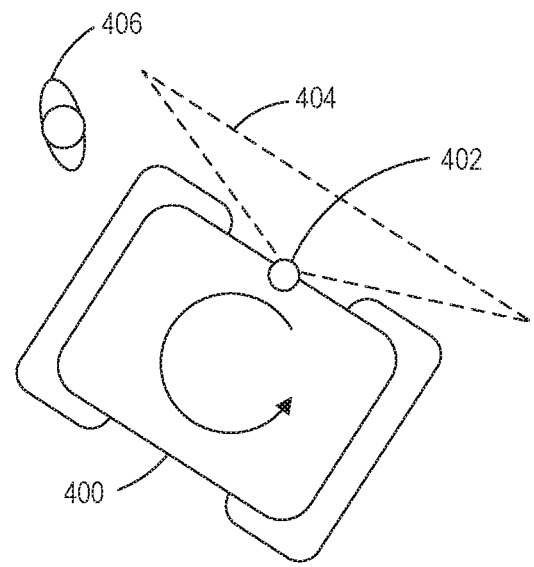
FIGS. 4A and 4B illustrate example rotating work machines with cameras used to identify and track objects-of-interest.
Figure 4B:
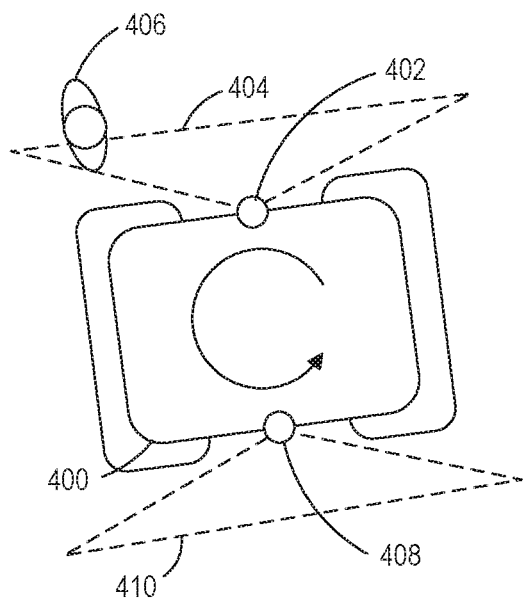

FIGS. 4A-4B are diagrams illustrating an example rotating work machine with a camera used to identify and track objects-of-interest as described by any of the methods 100-300 discussed herein. The work machine 400 may be an excavator, for example, or any other rotating work machine. In FIG. 4A, the work machine 400 includes a single camera 402. The camera 402 may be configured to generate image data for a field-of-view 404 and provide the generated image data to a controller. The controller may be local to the camera 402, part of a control system of the work machine 400, or any other controller.

The machine 400 is configured to rotate about an axis. In the examples illustrated in FIGS. 4A and 4B, the work machine rotates counterclockwise, but in other examples, the work machine 400 may rotate clockwise. As the work machine 400 rotates, the camera 402 and associated field-of-view 404 also rotate such that an object 406 enters the field-of-view 404. As the work machine 400 continues to rotate, the object 406 moves out of the field-of-view 404, and once the work machine 400 has fully rotated, the object 406 will once again move into the field-of-view 404. To prevent outputting an alarm each time the object re-enters the field-of-view 404, the method 100 may be used to generate a mask for the object 406 such that the alarm for the object 406 can be snoozed. If the object 406 moves, the alarm may once again be output to the operator of the work machine and the mask may be updated if so desired.

FIG. 4B illustrates a work machine 400 that includes a second camera 408 in addition to the camera 402. Similar to the camera 402, the object 406 will move into and out of the field-of-view 410 of the camera 408 as the work machine 400 rotates. If the object 406 is first detected using the camera 402 and snoozed by the operator of the work machine 400, the mask may be converted for the coordinates of the camera 408 so that an alarm is not output to the operator as discussed with respect to the method 300.

Figure 5A:
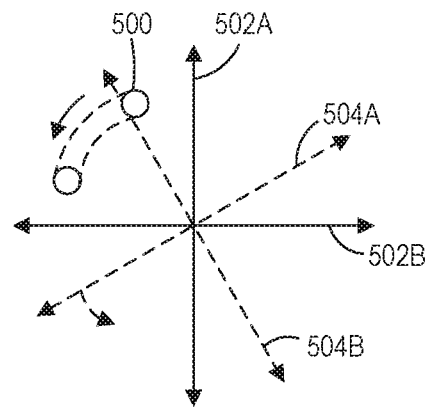
FIGS. 5A and 5B are example masks generated for objects-of-interest with respect to a reference frame of a work machine and a geometric reference frame.
Figure 5B:
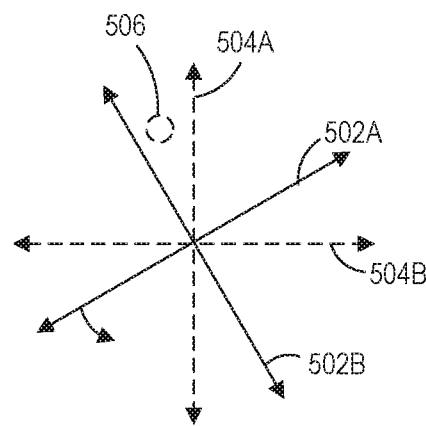

FIGS. 5A and 5B are diagrams illustrating example masks generated for objects-of-interest with respect to a reference frame of a work machine and a static geometric reference frame. FIG. 5A is a diagram illustrating an example mask 500 that rotates with respect to the reference frame of the work machine 400. The axes 502A and 502B are the axes with respect to the rotational axis of the work machine 400 and are stationary as the work machine 400 rotates. The axes 504A and 504B are geometric axes that are centered on the axis of the work machine 400 but rotate with respect to the reference frame of the work machine 400.

The mask 500 rotates with respect to the axes 502A and 502B and may be defined using one or more equations, a series of coordinates, or in any other way. For example, the detected object will remain in the field-of-view of the camera and move through the field-of-view of the camera as the work machine rotates. The object can be tracked as the object moves through the field-of-view to identify how fast the object is "rotating" with respect to the reference frame of the work machine, and the mask can be extrapolated accordingly.

FIG. 5B illustrates a static mask 506 that is static with respect to the axes 502A and 502B such that the mask 506 does not rotate with respect to the axes 502A and 502B. The mask 506 may be generated from the mask 500 as described above with respect to FIG. 2, for example, or using any other method.

Figure 6:
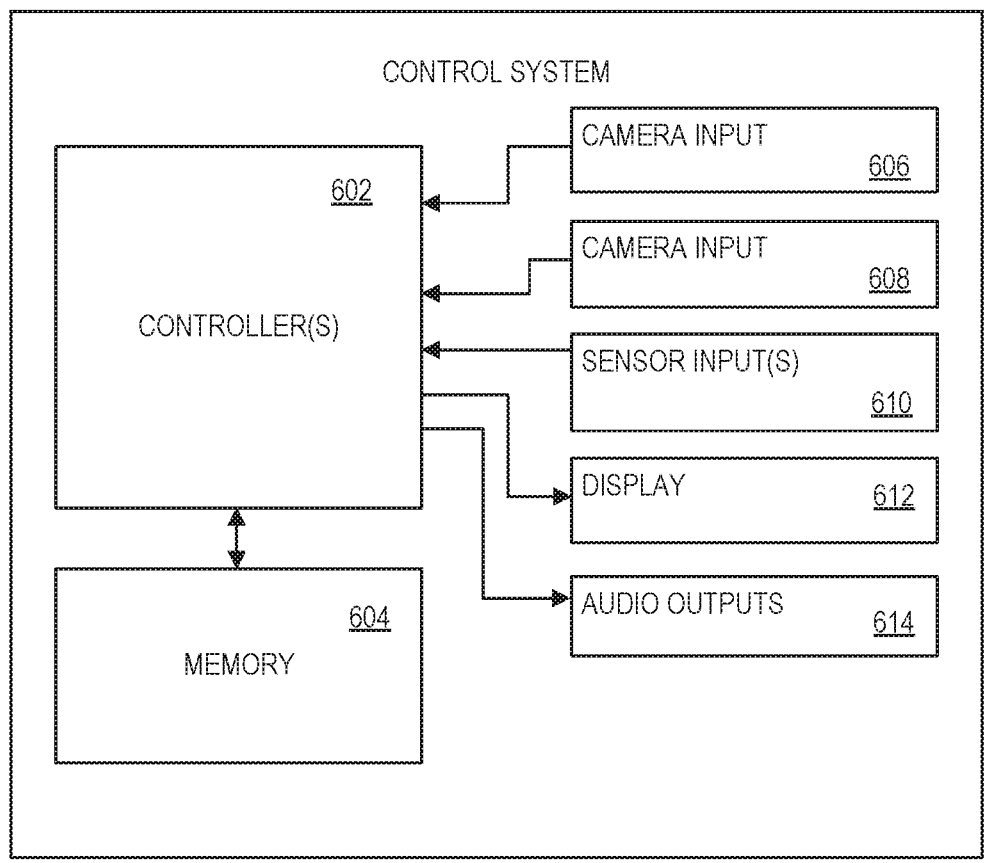
FIG. 6 is an example control system for a work machine configured to identify and track objects-of-interest with respect to a work machine.

FIG. 6 is an example control system for a work machine configured to identify and track objects-of-interest with respect to a work machine in motion. The control system 600 includes one or more controllers 602, memory 604, camera inputs 606 and 608, other sensor input(s) 610, display 612, and audio output 614.

The controller 602 and memory 604 can include, for example, software, hardware, and combinations of hardware and software configured to execute several functions related to the methods 100, 200, and 300. The controller 602 can include an analog, digital, or combination analog and digital controller including a number of components. As examples, the controller 602 can include integrated circuit boards or ICB(s), printed circuit boards or PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The memory 604 may include storage media to store and/or retrieve data or other information such as, for example, stored masks. Storage devices, in some examples, are described as a computer-readable storage medium. The memory 604 can be used to store program instructions for execution by processor(s) of the controller 602, for example. The memory 604, for example, are used by software, applications, algorithms, as examples, running on and/or executed by the controller 602. The memory 604 can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

The camera inputs 606 and 608 may be derived from or configured to provide image data from one or camera of the work machine, such as the cameras 402 and 408, for example. The sensor(s) input 610 may be derived from or configured to provide sensed data from one or more other sensors of the work machine, such as radar sensors, lidar sensors, position sensors, or any other sensor associated with the work machine. The display 612 may be a display integrated within the work machine or a mobile display. The audio output device 614 may be a speaker or other audio output device configured to output an alarm to an operator of the work machine.

Figure 7:
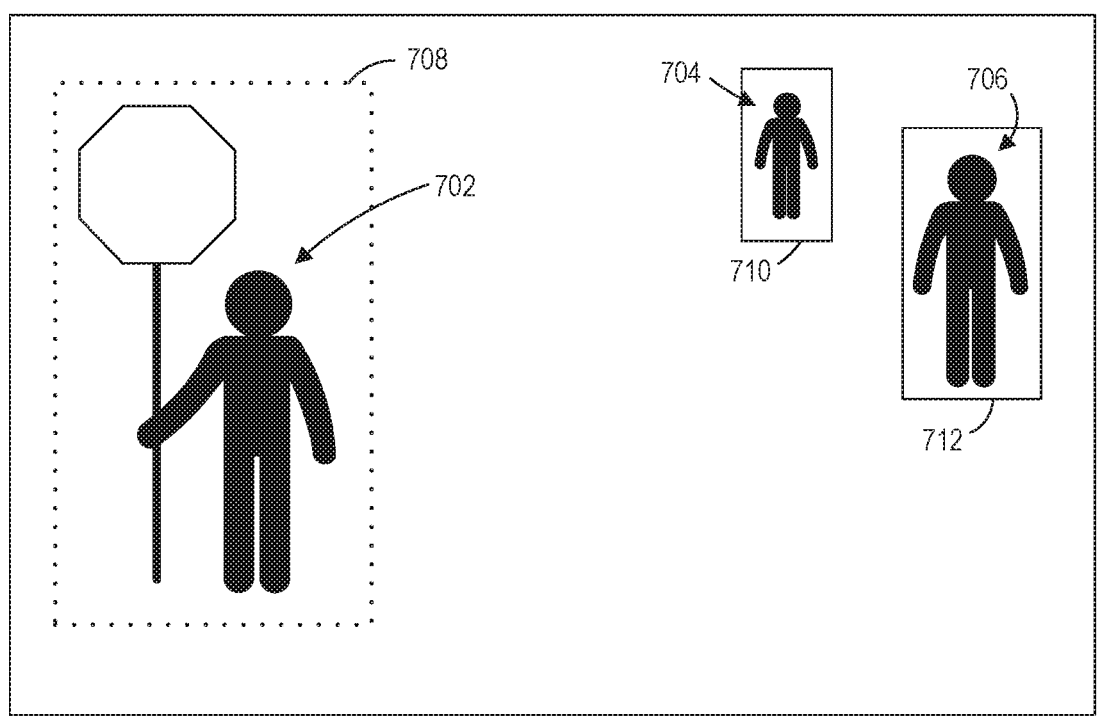
FIG. 7 is an example display for outputting alerts to an operator of a work machine for detected and snoozed objects-of-interest.

FIG. 7 is an example display 700 for outputting alerts to an operator of a work machine for detected and tracked objects-of-interest. The display may be output on a display of an operator of a work machine 400, for example. The display may be integrated with a control system of the work machine, for example, such as the control system 600, or may be a mobile display used by a remote operator of a remotely controlled work machine. The display 700 may be configured to output image data captured by one or more cameras associated with the work machine. In some examples, the display may also output an identifier for the camera that captured the respective image data.

In the example illustrated in FIG. 7, three objects, illustrated as persons, are detected. The object 702 has previously been snoozed by an operator of the work machine. The objects 704 and 706 have not been previously snoozed. The visual indicator 708, illustrated as a dashed line, is different than the visual indicators 710 and 712, illustrated as solid lines, to indicate to the operator of the work machine that the object 702 has been snoozed but the objects 704 and 706 have not. An audible alarm may also be output to the operator for the objects 704 and 706 through one or more audio output devices, such as speakers. In some examples, rather than solid and dashed lines, other visual properties, such as different colors, may be used to differentiate between snoozed and non-snoozed alarms.

In some examples, the display may be a touchscreen such that an operator of the work machine may tap one or more of the objects 704 and 706 to snooze the respective object. The operator may also tap the object 702 to "un-snooze" the object 702. In these examples, the indicators 708, 710, and 712 may be updated in response to receiving the control from the operator. In other examples, the operator may select one or more of the objects 702, 704, and 706 using a separate control input such as a joystick, one or more buttons, a control pad, and the like.

In examples with multiple cameras, it may be desirable to indicate which displayed objects 702, 704, and 706 were sourced from which respective camera when snoozing a respective object. In these examples, the indicators 708, 710, and 712 may also include an associated label or indicator that, for each respective object, indicates the source camera. This way, when selecting an object 702, 704, or 706, the source camera can be identified for snoozing and un-snoozing the object.

INDUSTRIAL APPLICABILITY

In one illustrative example, an excavator is rotating and includes a camera mounted to the excavator for detecting objects. As the excavator rotates, an object is detected in the image data captured by the camera and an alarm is output to an operator of the excavator to alert the operator to the presence of the object. The object may be a person for which the operator of the excavator is aware, such as a flagger. Thus, the operator may not want the alarm to be output each rotation of the excavator and may snooze the alarm for the object. Upon receiving the input to snooze the alarm, a mask is generated for the object. The mask may generated such that the mask rotates with respect to the reference frame of the excavator, or may be converted to a stationary mask with respect to the rotating reference frame of the excavator.

Following rotation of the excavator, the object is once again detected in the image data captured by the camera. The mask is compared to the coordinates of the detected object and it is determined that the object has been snoozed, so an alarm is not output to the operator. This is advantageous in that it allows operators of the excavator to snooze alarms for objects/persons that the operator knows are supposed to be in the vicinity of the excavator and would otherwise generate an alarm each rotation, increasing the likelihood that the operator will continue to use the object detection systems and not disable or otherwise ignore the object detection system.

The above detailed description is intended to be illustrative, and not restrictive. The scope of the disclosure should, therefore, be determined with references to the appended claims, along with the full scope of equivalents to which such claims are entitled.

What is claimed is:

1. A method for monitoring objects in the vicinity of a work machine that is in motion, the method comprising:
   obtaining, using a camera associated with the work machine, first image data of a field-of-view of the camera at a first position;
   identifying an object-of-interest within the first image data;
   associating an alarm with the object-of-interest, the alarm configured to indicate the presence of the object-of-interest;
   presenting the alarm through an output device, wherein the output device is a display device of the work machine;
   receiving an input to snooze the alarm for the object-of-interest, wherein receiving the input to snooze the alarm for the object-of-interest comprises:
      generating a display indicator for output to the display device, the display indicator providing a visual display for the object-of-interest; and
      changing a property of the display indicator upon receipt of the input to snooze the alarm for the object-of-interest;
   generating a mask for the object-of-interest using image coordinates of the object-of-interest within the first image data;
   obtaining, using the camera, second image data of the field-of-view of the camera at a second position during motion of the work machine;
   identifying an object within the second image data; and
   selectively aborting the alarm presentation through the output device of the work machine in response to determining, using the mask, that the object is the object-of-interest.

2. The method of claim 1, wherein the motion of the work machine is rotation about an axis of the work machine, and wherein the first and the second position are rotational positions of the work machine, and wherein the mask rotates with respect to a stationary reference frame of the work machine.

3. The method of claim 1, wherein the motion of the work machine is rotation about an axis of the work machine, and wherein the first and the second position are rotational positions of the work machine, and wherein generating the mask for the object-of-interest comprises:
   identifying information about the rotation of the work machine from the first position to the second position; and
   generating a stationary mask with respect to the work machine using the information about the rotation of the work machine.

4. The method of claim 1, wherein the camera is a first camera and the object is a first object, and wherein the method further comprises:
   obtaining, using a second camera, third image data for a field-of-view different than the field-of-view of the first camera at a third position;
   identifying a second object within the third image data; and
   identifying the second object as the object-of-interest using the mask for the object-of-interest.

5. The method of claim 1, wherein changing the property of the display indicator comprises changing a color of the display indicator to a color different than a color for alarms for objects that are not snoozed.

6. The method of claim 1, wherein the object is a first object, and wherein the method further comprises:
   obtaining, using the camera, third image data of the field-of-view of the camera during motion of the work machine at a third position;
   identifying a second object within the third image data;
   determining, using the mask, that the second object is not the object-of-interest; and
   presenting an alarm through the output device for the second object.

7. A system for monitoring objects in the vicinity of a work machine that is in motion, the system comprising:
   a camera associated with the work machine and configured to obtain image data for a field-of-view of the camera;
   an output device, wherein the output device is a display device of the work machine; and
   a controller associated with the camera, the controller configured to:
      obtain, using the camera, first image data of the field-of-view of the camera at a first position;
      identify an object-of-interest within the first image data;
      associate an alarm with the object-of-interest, the alarm configured to indicate the presence of the object-of-interest;
      present the alarm through the output device;
      receive an input to snooze the alarm for the object-of-interest, wherein receiving the input to snooze the alarm for the object-of-interest comprises causing the controller to be configured to:
         generate a display indicator for output to the display device, the display indicator providing a visual display for the object-of-interest; and
         change a property of the display indicator upon receipt of the input to snooze the alarm for the object-of-interest;
      generate a mask for the object-of-interest using image coordinates of the object-of-interest within the first image data;
      obtain, using the camera, second image data of the field-of-view of the camera at a second position during motion of the work machine;
      identify an object within the second image data; and
      selectively abort the alarm presentation through the output device in response to determining, using the mask, that the object is the object-of-interest.

8. The system of claim 7, wherein the motion of the work machine is rotation about an axis of the work machine, wherein the first position and the second position are rotational positions of the work machine, and wherein the mask rotates with respect to a stationary reference frame of the work machine.

9. The system of claim 7, wherein the motion of the work machine is rotation about an axis of the work machine, wherein the first position and the second position are rotational positions of the work machine, and wherein the controller is configured to generate the mask for the object-of-interest by:
   identifying information about the rotation of the work machine from the first position to the second position; and
   generating a stationary mask with respect to the work machine using the information about the rotation of the work machine.

10. The system of claim 7, wherein the camera is a first camera and the object is a first object, and wherein the system further comprises a second camera, and wherein the controller is further configured to:

obtain, using the second camera, third image data for a field-of-view different than the field-of-view of the first camera at a third position;

identify a second object within the third image data; and identify the second object as the object-of-interest using the mask for the object-of-interest.

11. The system of claim 7, wherein changing the property of the display indicator comprises changing a color of the display indicator to a color different than a color for alarms for objects that are not snoozed.

12. The system of claim 7, wherein the object is a first object, and wherein the controller is further configured to:

obtaining, using the camera, third image data of the field-of-view of the camera during motion of the work machine at a third position;

identifying a second object within the third image data;

determining, using the mask, that the second object is not the object-of-interest; and presenting an alarm through the output device for the second object.

13. A control system for a work machine, the control system comprising:

one or more hardware processors; and a memory, storing instructions, which when executed, cause the one or more hardware processors to perform operations comprising:

obtaining, using a camera associated with the work machine, first image data of a field-of-view of the camera at a first position of the work machine;

identifying an object-of-interest within the first image data;

associating an alarm with the object-of-interest, the alarm configured to indicate the presence of the object-of-interest;

presenting the alarm through an output device;

receiving an input to snooze the alarm for the object-of-interest, wherein the operations of receiving the input to snooze the alarm for the object-of-interest comprise:

generating a display indicator for output to a display of the work machine, the display indicator providing a visual display for the object-of-interest; and changing a property of the display indicator upon receipt of the input to snooze the alarm for the object-of-interest;

generating a mask for the object-of-interest using image coordinates of the object-of-interest within the first image data;

obtaining, using the camera, second image data of the field-of-view of the camera at a second position during motion of the work machine;

identifying an object within the second image data; and selectively aborting the alarm presentation through the output device in response to determining, using the mask, that the object is the object-of-interest.

14. The control system of claim 13, wherein the motion of the work machine is rotation about an axis of the work machine, and wherein the first position and the second position are rotational positions of the work machine, and wherein the mask rotates with respect to a stationary reference frame of the work machine.

15. The control system of claim 13, wherein the motion of the work machine is rotation about an axis of the work machine, and wherein the first position and the second position are rotational positions of the work machine, and wherein the operations of generating the mask for the object-of-interest comprise:

identifying information about the rotation of the work machine from the first position to the second position of the work machine; and generating a stationary mask with respect to the work machine using the information about the rotation of the work machine.

16. The control system of claim 13, wherein the camera is a first camera and the object is a first object, and wherein the operations further comprise:

obtaining, using a second camera, third image data for a field-of-view different than the field-of-view of the first camera at a third position of the work machine;

identifying a second object within the third image data; and identifying the second object as the object-of-interest using the mask for the object-of-interest.

17. The control system of claim 13, wherein the object is a first object, and wherein the operations further comprise:

obtaining, using the camera, third image data of the field-of-view of the camera during motion of the work machine at a third position of the work machine;

identifying a second object within the third image data;

determining, using the mask, that the second object is not the object-of-interest; and outputting an alarm to alert the operator of the work machine to the presence of the second object.

18. The method of claim 1, wherein the alarm comprises an auditory signal outputted through one or more speakers associated with the display device.

19. The method of claim 1, wherein the display device is at least one of a mobile device in communication with the work machine or a display device integrated into the work machine.

20. The method of claim 1, wherein the camera is a plurality of cameras, and wherein presenting the alarm through the output device comprises at least indicating on the display device a camera of the plurality of cameras that identified the object.

* * * * *